United States Patent Office 3,129,093
Patented Apr. 14, 1964

3,129,093
PROCESS FOR PRODUCING A COMPOSITE METAL
OXIDE PARTICLE IN A COLLOIDAL AQUASOL
Guy B. Alexander and Paul C. Yates, Brandywine Hundred, Del., assignors to E. I. du Pont de Nemours and Company, Wilmington, Del., a corporation of Delaware
No Drawing. Original application July 16, 1958, Ser. No. 748,828, now Patent No. 3,069,292, dated Dec. 18, 1962. Divided and this application Nov. 30, 1961, Ser. No. 156,160
5 Claims. (Cl. 75—.5)

This invention relates to modifying metals with dispersed refractory metal oxides. More particularly, the invention is directed to processes for producing compositions, adapted for dispersion in metals, comprising discrete particles having a core 5 to 500 millimicrons in size and comprising a metal oxide with a melting point above 1550° C. and a free energy of formation at 1000° C. greater than 100 kilocalories per gram atom of oxygen in the oxide, the core being covered with a coating of an oxide of a metal selected from the group consisting of vanadium, niobium, manganese, chromium, and titanium, the oxide coating preferably containing not more than one oxygen atom for each metal atom. The invention is further more particularly directed to such processes comprising forming a dispersion, in a liquid, of substantially discrete particles which are 5 to 500 millimicrons in size and comprise a refractory metal oxide filler having a melting point above 1550° C. and a free energy of formation at 1000° C. greater than 100 kilocalories per gram atom of oxygen, effecting contact in said liquid between the dispersed filler particles and a dissolved compound of a metal selected from the group consisting of vanadium, niobium, manganese, chromium, and titanium, precipitating an oxide of the selected metal together with the refractory filler particles whereby the particles are coated with the precipitated oxide, and recovering the coated filler from the liquid, and preferably reducing the oxide coating on the filler with hydrogen until its oxygen content is in the range of from 0.1 to 1.0 atom per atom of metal. The invention is still further directed to processes comprising dispersing oxide-coated filler particles of the type described, preferably those of reduced oxygen content, in a metal having an oxide with a free energy of formation at 27° C. up to 75 kilocalories per gram atom of oxygen in the oxide.

This application is a division of our prior copending application Serial No. 748,828, filed July 16, 1958, now Patent No. 3,069,292.

It has been proposed to modify the properties of metals by dispersing in them small fragments of refractory materials, on the theory that the fragments would lodge at the grain boundaries and prevent slippage, whereby the metals would be hardened. It has been suggested to use various high-melting metalloids as the refractory particles. However, the results predicted in theory have not been realized in practice.

For reasons which are not readily apparent, some refractories do not perform satisfactorily in various metals. The oxides of transition elements, especially, appear from theoretical considerations to be entirely suitable, but efforts to modify such metals as iron, cobalt and nickel with such oxides have not given the expected improvement in properties.

Now it has been recognized, as background of the present invention, that certain refractory metal oxides do not give the desired result in improving the properties of metals, especially the high-temperature properties, because the particles of these oxides grow, under heating, to a size which is too large to be suitable. This is true especially of refractory oxides having a free energy of formation at 1000° C. of less than about 100 kilocalories per gram atom of oxygen in the oxide.

On the other hand, it has also been recognized that refractory oxides having a free energy of formation at 1000° C. above 100 kilocalories per gram atom of oxygen in the oxide did not form a good bond with metals in which it was sought to disperse them. This is thought to be caused by poor wetting of the refractory oxide by the metal. Whatever the explanation, the bond between the more refractory oxides and the matrix metal was not as strong as desired.

The foregoing deficiencies are overcome in the processes of this invention by providing processes for dispersing refractory particles in metals, the particles comprising a coating of an oxide of a transition metal selected from the group consisting of vanadium, niobium, manganese, chromium, or titanium upon a core of an oxide having a free energy of formation at 1000° C. greater than 100 kilocalories per gram atom of oxygen in the oxide and having a melting point above 1550° C. These coated particles, when dispersed in a metal having an oxide with a free energy at 27° C. less than 75 kilocalories per gram atom of oxygen in the oxide effect a substantial improvement in the properties of the metal.

The coated particles do not grow inordinately even at very high temperatures when dispersed in the described metals. On the other hand, they bond very tightly to such metals. It will be seen, therefore, that both the high-temperature stability against growth of the core particles, plus the easy wettability of the coating, are utilized to advantage.

Composite particles in which the coating is a lower oxide of the transition metal are preferred embodiments which can be prepared by processes of the present invention. By a lower oxide is meant one in which the atomic ratio of oxygen to metal is less than 1. Such oxides form better bonds to metals than do higher oxides. They can be prepared by processes of the invention in which the higher oxides are partially reduced with hydrogen at elevated temperatures.

For convenience in describing this invention certain abbreviations will be used. Free energy of formation will be kilocalories per gram atom of oxygen in the oxide, as determined at 27° C. unless otherwise specified, and will be called ΔF. Surface areas of the refractory oxide will be in terms of square meters per gram, and particle diameters will be millimicrons, abbreviated mμ. Particle densities will be grams per milliliter. The particulate refractory oxide core with its coating will sometimes be referred to as the filler.

*The Core*

The refractory oxide employed as a core is one which is stable to growth at elevated temperatures, has a very high melting point, and is not easily reduced by hydrogen which may be employed to reduce the coating of transition metal oxide. The free energy of formation at 1000° C. of refractory oxides is an indication of their ease of reducibility, the higher the ΔF, the less reducible the oxide. The reduction conditions in the hydrogen reduction process are so rigorous that only refractory oxide metals having a ΔF, at 1000° C., above 100 kilocalories are suitable.

The refractory can be a mixed oxide, particularly one in which each oxide conforms to the melting point and ΔF as stated above. Thus, the refractory can be a single metal oxide or a reaction product of two or more metal oxides, preferably each of which is useful alone.

Typical single oxide refractories useful as cores are calcium oxide, thoria, magnesia and the rare earth oxides including mixed rare earth oxides, such as didymium oxide. A more complete list of suitable oxides, together with their free energies of formation is shown below:

| Oxide | ΔF at 1,000° C. | Melting Point, ° C. |
| --- | --- | --- |
| $Y_2O_3$ | 125 | 2,410 |
| $CaO$ | 122 | 2,707 |
| $La_2O_3$ | 121 | >2,000 |
| $BeO$ | 120 | 2,400 |
| $ThO_2$ | 119 | >2,800 |
| $MgO$ | 112 | 2,642 |
| $UO_2$ | 105 | 2,176 |
| $HfO_2$ | 105 | ca 2,700 |
| $CeO_2$ | 105 | 1,950 |
| $Al_2O_3$ | 104 | 2,045 |
| $ZrO_2$ | 100 | 2,715 |

The refractory oxide core must initially be in a finely divided state. The substantially discrete particles should have an average dimension in the size range of 5 to 500 m$\mu$, an especially preferred range being from 5 to 250 m$\mu$ with a minimum of 10 m$\mu$ being even more preferred. (Note that 250 m$\mu$ particles have a surface area of 24/D, and 10 m$\mu$, of 600/D, D being the density of the particles in grams per milliliter.)

Powders of refractory oxides prepared by burning the corresponding metal chlorides, as, for example, by burning zirconium tetrachloride or thorium tetrachloride, to the oxide, are useful as cores if the oxides are obtained primarily as discrete, individual particles, or aggregated structures which can be dispersed to such particles. However, because colloidal metal oxide aquasols already contain particles in the most desirable size range and state of subdivision, these are preferred starting materials for use in the processes of the invention.

The art is familiar with various methods for producing aquasols of colloidal metal oxides. The preparation of sols as described by Weiser in "Inorganic Colloidal Chemistry," vol. 2, "Hydrous Oxides and Hydroxides," for example, can be used to advantage. For instance, at page 177 of the 1935 edition there is described the preparation of a beryllia aquasol which can be used in the novel processes.

Especially preferred as starting materials are thoria aquasols prepared by hydrolyzing thorium nitrate.

The refractory particles should be dense and anhydrous for best results, but aggregates of smaller particles can be used, provided the discrete particles of aggregate have the above-mentioned dimensions. Particles which are substantially spheroidal or cubical in shape are also preferred, although anisotropic particles such as fibers or platelets can be used for special effects.

The size of a particle is given as an average dimension. For spherical particles all three dimensions are equal and the same as the average. For anisotropic particles the size is considered to be one third of the sum of the three particle dimensions. For example, a fiber of alumina might be 500 m$\mu$ long but only 10 m$\mu$ wide and thick. The size of this particle is $$\frac{500+10+10}{3} \text{ or } 173 \text{ m}\mu$$

and hence within the limits of this invention.

The initial refractory oxide core preferably should not only have the particle size as above stated but also should have a surface area, in square meters per gram, of from 12/D to 1200/D, where D is the density of the particles in grams per milliliter. For instance, thoria particles have a density of 9.7 grams per milliliter; hence when thoria is used it should have a surface area from 1.2 to 124 square meters per gram.

The refractory oxide of the core must have a melting point above 1550° C. At such elevated temperatures melting point is sometimes difficult to determine accurately but in any event the refractory oxide should not melt, decompose, or sublime below 1550° C. The oxides in the foregoing table all meet this requirement.

*The Coating*

The coating on the refractory oxide core consists of an oxide of a transition metal selected from the group consisting of vanadium, niobium, manganese, chromium, and titanium. While any of these oxides can be used for coating any of the suitable core materials as above indicated, the coating can sometimes advantageously be selected with reference to the particular core upon which it is to be used. Thus, in selecting the coating, it is preferred to match the size and valence of the metal in the coating oxide as closely as possible to the metal in the core oxide. For instance, coatings of titania on thoria, chromia on alumina, or chromia on the mixed rare earth oxides of the lanthanum series are preferred embodiments of the invention.

The thickness of the coating can be considerably varied, but ordinarily its total volume will be less than the volume of the core. At least a monomolecular layer of coating should be present and ordinarily up to 10 or 20 monolayers can be used to advantage. However, since the coating is needed only to provide suitable surface characteristics for the core, a great excess of coating over that required for complete coverage of the core particles is not advantageous and is avoided.

The oxide of the coating is preferably a lower oxide of the transition metal—that is, one in which the atomic ratio of oxygen to metal is less than 1. It will be understood, of course, that the oxide coating can be applied in the form of a higher oxide and the higher oxide can be reduced as with hydrogen as more fully described hereinafter.

*Coating the Core*

The first step in coating the core is to form a dispersion of the core particles in a liquid. Organic liquids, such as ethanol, acetone, or other water-misible liquids can be used, but ordinarily, a dispersion of the core particles in water is preferred. As already mentioned, colloidal aquasols of the refractory core oxides are easily prepared, contain particles in the optimum size range, especially suitable.

Contact between the dispersed core particles and a dissolved compound of the metal selected from the group consisting of vanadium, niobium, manganese, chromium, or titanium is next effected. This can be done by dissolving a salt of the selected metal in water and mixing the solution with the dispersion. For instance, chromium nitrate, $Cr(NO_3)_3$; manganese chloride, $MnCl_2$; titanium chloride, $TiCl_4$; vanadium chloride, $VCl_3$; or niobium chloride, $NbCl_3$, can be dissolved and the solution mixed with the core dispersion.

Having mixed the compound of the selected metal with the dispersion of the core, the oxide of the selected metal is then precipitated. This can be done, for instance, by adding an alkali such as sodium carbonate, ammonia, or sodium hydroxide to the solution of selected metal salt. Alternatively, a chloride such as titanium tetrachloride can be added to the core dispersion and then hydrolyzed to the oxide. Intensive agitation of the core dispersion should be effected until precipitation of the coating oxide has been completed, since otherwise there is danger that the core particles will settle out and aggregate to a size outside that specified as the maximum.

If it is desired to produce the coated particles in the form of a dry powder, the coated product is recovered from the liquid medium by methods with which the art is already familiar. Thus, it can be settled out, centrifuged, filtered, or recovered by any other suitable means. The recovered product is preferably washed and dried, the drying being continued long enough, and being conducted at a sufficiently high temperature, to drive off any water of association in the product.

Reducing the Coating

In a preferred aspect of the invention, the coating oxide is a lower oxide. This can be precipitated as such, and in this event drying of the coated product will ordinarily be effected under reducing conditions or at least in the absence of air or oxidizing influences. The drying may thus be effected under argon as an inert gas, hydrogen as a reducing gas, or under vacuum. It is often most feasible, however, to precipitate the coating oxide as a layer of a higher oxide and then reduce this coating with hydrogen at elevated temperature. In this process temperatures up to 1100° C. can be used. At higher temperatures than this there is danger of reducing the oxide of the coating to metallic form. Preferably the reduction is carried out at 900 to 1100° C. and is continued only until a suboxide is formed. In this manner, the suboxide, TiO, can be formed from $TiO_2$, CrO from $Cr_2O_3$, and other suboxides from oxides in which the metal has higher valence.

For the more easily reduced oxide coatings, such as $Cr_2O_3$ and $MnO_2$, it is preferred to use temperatures near the lower end of the specified range—that is, it is preferred to use the minimum temperature for the hydrogen reduction which will produce the desired suboxide.

In use it appears that the suboxides are more readily wetted by the matrix metals which are to be modified by the coated particles than are the higher oxides. Whatever may be the explanation, it has been observed that the bonding of metals to the coated refractory particles is improved by partial reduction.

The Coated Products

The products of processes of this invention are in the form of particles suitable for dispersion in metals. They comprise the core and coating, but since the coating is usually relatively thin the particle size of the coating is not substantially larger than the core—that is, not much larger than 5 to 500 millimicrons in size. The products of smaller particle size are loosely agglomerated, but the agglomeration is not sufficient to prevent them from dispersing readily in metals.

The products can be characterized by ordinary techniques such as with the aid of the electron microscope. The chemical nature of the coating on the core can be determined by analysis, determining the oxygen content and the content of metal in the core and in the coating. One then ascribes sufficient oxygen to the core metal to satisfy it—that is, to form a refractory oxide with the metal, and the balance is considered to be associated as the coating metal oxide.

Dispersing the Coated Particles in Metals

The composite particles as above described have utility for dispersion in metals to modify their properties and especially to improve their high-temperature service characteristics. Processes for modifying metals with the particles are thus a further aspect of the invention.

The metal in which such dispersion is effected is one having an oxide with a free energy of formation of up to 75 kilocalories per gram atom of oxygen in the oxide. This group includes metals whose oxides can be reduced by hydrogen at 1000° C., such as the following:

| Metal | Oxide | ΔF of Oxide at 27° C. |
|---|---|---|
| Iron | FeO | 59 |
| Cobalt | CoO | 52 |
| Nickel | NiO | 51 |
| Copper | $Cu_2O$ | 35 |
| Cadmium | CdO | 55 |
| Thallium | $Tl_2O$ | 40 |
| Germanium | $GeO_2$ | 58 |
| Tin | SnO | 60 |
| Lead | PbO | 45 |
| Antimony | $Sb_2O_3$ | 45 |
| Bismuth | $Bi_2O_3$ | 40 |
| Molybdenum | $MoO_2$ | 60 |
| Tungsten | $WO_2$ | 60 |
| Rhenium | $ReO_3$ | 45 |
| Indium | $In_2O_3$ | 65 |
| Silver | $Ag_2O$ | 3 |
| Gold | $Au_2O$ | 0 |
| Ruthenium | $RuO_2$ | 25 |
| Rhodium | $Rh_2O$ | 20 |
| Palladium | PdO | 15 |
| Osmium | $OsO_4$ | 20 |
| Platinum | PtO | 0 |

If the metal being modified has a low melting point, i.e., is a metal such as lead or tin, the coated particles can be stirred into the molten metal directly and dispersion can be achieved merely with agitation. However, with the higher melting metals, such as iron, cobalt, nickel, molybdenum and tungsten—that is, metals melting above 1450° C. indirect methods are preferred, to avoid coalescence of the coated filler.

Accordingly, in this embodiment of the invention the metal-filler concentrate is prepared by precipitating a compound of the metal in which the metal is in an oxidized state, in contact with the dispersed filler particles, and then reducing the metal compound to the corresponding metal as by treating it, after drying, with hydrogen at elevated temperatures.

The precipitated compound of the metal can be the oxide, hydroxide, hydrous oxide, oxycarbonate, or hydroxycarbonate. Since these compounds, as precipitated, usually contain varying amounts of water, they can be referred to generally as hydrous, oxygen-containing compounds of the metal.

The precipitated metal compound can be one of a single metal or of two or more metals. For example, the hydrous oxides of both nickel and cobalt can be deposited around a filler. In the latter case, an alloy of cobalt and nickel is produced directly, during the reduction step. In similar manner, alloys of iron, cobalt or nickel, for example, can be prepared with other metals which form hydrogen-reducible, hydrous, oxygen-containing compounds. Thus, alloys with copper, molybdenum, tungsten, and rhenium can be prepared by codepositing two or more oxides of the selected metals on the filler particles.

The hydrous, oxygen-containing compound can be precipitated from solutions in which it is present as the corresponding soluble salt. Preferably, the salt is a metal nitrate, although metal chlorides, sulfates, and acetates can be used. Ferric nitrate, cobalt nitrate, nickel, nitrate, ammonium molybdate, and sodium tungstate are among the preferred starting materials.

Methods for precipitating oxygen-containing metal compounds from solutions of the corresponding metal salts are well known in the art and any such method can be used. For instance, an alkali can be added to a solution of the metal nitrate. When, on the other hand, the metal is in the form of a basic salt, such as sodium molybdate, precipitation can be effected by acidifying.

A preferred method for surrounding the filler particles with the oxygen-containing compound of metal is to coprecipitate the filler particles from an aqueous dispersion such as a colloidal aquasol simultaneously with the precipitation of the metal compound. One convenient way to do this is to add, simultaneously but separately, a solution of the soluble metal salt, a colloidal aquasol containing the filler particles, and an alkali such as sodium hydroxide, to a heel of water. Alternatively, a dispersion containing the filler particles can be used as a heel and the metal salt solution and alkali added simultaneously but separately thereto.

During such a coprecipitation process certain precautions are preferably observed. It is preferred not to coaugulate or gel the filler particles. Coagulation and gelation are avoided by working in dilute solutions, or by simultaneously adding the filler and the metal salt solution to a heel.

The filler particles should be completely surrounded with the precipitated, reducible metal compound, so that when reduction occurs later in the process, aggregation and coalescence of the filler particles is avoided. In other words, the particles of the filler are discrete and not in contact, one with another, in the coprecipitated product. Vigorous mixing and agitation during the coprecipitation helps to insure the desired result.

After depositing the insoluble metal compound on the filler, any salts present are removed, as by washing. When one uses an alkali such as sodium hydroxide, potassium hydroxide, lithium hydroxide, ammonium hydroxide, or tetramethylammonium hydroxide to effect precipitation, salts such as sodium nitrate, ammonium nitrate or potassium nitrate are formed. These should be removed. One of the advantages of using the nitrate salts in combination with aqeuous ammonia is that ammonium nitrate is volatile and therefore is easily removed from the product. However, the tendency of many metals, such as cobalt and nickel, to form amine complexes is a complicating reaction in this case. By carefully controlling the pH during coprecipitation, these side reactions can be avoided.

A very practical way to remove salts is by filtering off the precipitate and washing it on the filter or repulping the filter cake and again filtering.

After removing soluble salts the product is dried, preferably at ultimate temperatures above 100° C. Alternatively, the product can be dried, and the dry material suspended in water to remove the soluble salts, and the product thereafter redried.

The relative amount of insoluble metal compound deposited upon the filler particles depends in part on the nature of the end product which it is desired to produce. For example, if the product is to be reduced and compacted directly to a dense mass of filled metal, after diluting with a relatively small amount of the bonding metal, then from 0.5 to 10 volume percent of filler in the metal composition is a preferred range, and 1 to 5 volume percent is even more preferred. On the other hand, if the product is to be used as a masterbatch, as, for example, for blending with a considerable quantity of unmodified metal powder before compaction, then considerably higher volume loadings can be used.

Volume loadings as high as 50 percent, that is, one volume of oxide for each volume of each metal present, can be successfully used, but such products are often pyrophoric. Even heating to 1000° C. after reduction does not completely eliminate this problem.

The pyrophoric tendency is minimized as the volume loading is decreased. In the range of 40 to 50 volume percent of filler, it is advisable to protect the modified metal in an inert atmosphere (hydrogen, argon or helium) until the material is blended with unmodified metal and compacted. At 30 volume percent, one can usually sinter the modified metal mass sufficiently that it can be handled in air.

The amount of precipitated metal compound which it is desired to deposit upon the filler will vary somewhat with the particle size of the filler and especially with its surface area. Thus, with the smaller sizes of filler particles, having surface areas greater than 200/D m.²/g., D being the density of the filler in grams per milliliter, volume loadings of from 0.5 to 5 percent are preferred. With relatively large particles—those, for example, in the size range of 100 millimicrons—one can use volume loadings near the upper end of the ranges above mentioned.

Having deposited on the filler particles the precipitate of compound of metal in oxidized state, and washed and dried the product, the next step is to reduce the metal compound to the metal. This can be done conveniently by subjecting the coated particles to a stream of hydrogen at a somewhat elevated temperature. The temperature throughout the entire mass must not be allowed to exceed the sintering temperature of the filler particles. One way to accomplish this is to place the product in a furnace at a controlled temperature and add hydrogen gas slowly; in this way, the reduction will not proceed so rapidly that large amounts of heat are liberated causing the temperature to get out of control.

The hydrogen used in the reduction can be diluted with an inert gas such as argon to reduce the rate of reaction and avoid "hot spots." In this way the heat of reaction is carried away in the gas stream. Alternatively, the temperature in the furnace can be slowly raised into the range of 500 to 1000° C. while maintaining a flow of hydrogen over the product to be reduced.

In addition to or instead of hydrogen, other reducing gases such as carbon monoxide, or methane and other hydrocarbon gases can be used as the reducing agent. In any case, it is important to control the temperature during reduction, not only to avoid premature sintering as above mentioned, but also so that excessive reaction will not occur between the reducible metal compound and the filler oxide prior to complete reduction of the metal compound.

Reduction should be continued until the metal compound is essentially completely reduced. When reduction is nearing completion, it is preferred to raise the temperature of the range between 700 and 1100° C. to complete the reaction, but care must be taken not to exceed the melting point of the reduced metal. During the reduction process very fine metal grains are formed. These tend to fuse and grow, but their ultimate size is restricted because of the presence of the filler particles. Thus, the size of grains obtained in this way is usually less than 10 microns.

Reduction should be carried out until the oxygen content of the mass is substantially reduced to zero, exclusive of the amount of oxygen originally introduced in the form of the oxide filler material. In any case, the oxygen content of the product, exclusive of the oxygen originally introduced in chemically combined form in the filler, should be in the range from 0 to 2 percent and preferably from 0 to 0.1 percent, based on the weight of the product.

The analysis for oxygen can be done by many methods with which the art is familiar, one such method being vacuum fusion as described by R. A. Yeaton in Vacuum vol. 2, No. 2, page 115, "The Vacuum Fusion Technique as Applied to Analysis of Gases in Metals."

Oxygen, other than that combined with the filler, may interfere with the function of the matrix metal, by reacting with the metal to yield its oxide. For this reason the oxygen level should be maintained in the range above stated until after mixing with the metal is complete.

After the reduction reaction is complete, the resulting powder is sometimes pyrophoric. Therefore, it is preferred to cool the mass in an inert atmosphere until it has been diluted with the bonding metal and compacted.

The powder prepared as above described is compacted to a solid metalliferous product. This can be done by compacting the powder to a dense mass, as by pressing in a die, by extruding, by rolling, or by any of the techniques used in powder metallurgy. The compacted mass of metal should have a density upwards of 95 percent of theoretical, preferably upwards of 98 percent. The "green" compact formed can be sintered, as at temperatures up to 90 percent of its melting point for up to 24 hours, to give it sufficient strength to hold together during subsequent working operations. Preferably, such sintering is effected in an atmosphere of clean, dry hydrogen.

The formed body so obtained can be subjected to intensive working, preferably at elevated temperatures. The working forces should be sufficient to effect plastic flow in the metals. Working should be continued until homogenization of the refractory oxide-metal grains is substantially complete. Homogeneity can be determined by metallographic and chemical analysis. Because the refractory oxide in the metal originally was present as substantially discrete particles, the worked metal product is characteristically substantially free of "fibering"—that is, alignment of refractory particles in the direction of working.

While working can be accomplished by such methods as swaging, forging and rolling, it is especially preferred to effect working by extruding the above-mentioned green compact through a die under extreme pressure, at temperatures approaching the melting point of the metal present—say, from 85 to 95 percent of the melting temperature in degrees absolute. Because the modified metal products are very hard, the working conditions needed are much more severe than for the unmodified metals. In the case of extrusion of a billet, the reduction in cross-sectional area preferably is upwards of 90 percent. Welding of the metal grains becomes nearly complete.

EXAMPLES

The invention will be better understood by reference to the following illustrative examples:

Example 1

In this example a colloidal thoria filler was surface-modified with titania. This was done by bubbling $TiCl_4$ vapor into a thoria aquasol, containing discrete thoria particles in the size range of 5 to 25 millimicrons, while maintaining the pH at about 2 with ion-exchange resin. The $TiCl_4$ hydrolyzed in the presence of the thoria particles and 3 parts by weight of $TiO_2$ was formed for each 10 parts of $ThO_2$ present in the original aquasol, the $TiO_2$ being present as a coating on the thoria particles.

The titania-coated thoria was dispersed in iron metal in the following manner:

A reactor was used to prepare a coprecipitate of iron hydrous oxide and the titania-thoria filler, consisting of a stainless steel tank with a conical bottom. The bottom of the tank was attached to a stainless steel piping, to which were attached three inlet pipes through T's. This circulating line then passed through a centrifugal pump of 20 g.p.m. capacity, and from the pump the line was returned to the tank. Initially, the tank was charged with 5 gallons of water. Equal volumes of three solutions containing the desired quantities of reagents were then added into the middle of the flowing stream through ⅛ inch diameter tubing attached to the T tubes. These solutions were added at uniform equivalent rates over a period of about one-half hour, the rates of addition being controlled with flow meters. Through the first T was added a solution of ferric nitrate; through the second, aqueous ammonia; through the third, the coated-thoria filler.

Two gallons of each reagent was used, including 2-molar ferric nitrate solution, a stoichiometric amount of ammonia, and the $TiO_2$-coated thoria aquasol. The pH of the solution in the tank was taken at frequent time intervals to insure proper operating. The slurry was circulated for a few minutes after the addition of the reagents had been completed, and then solution was pumped into a filter. Approximately 99 percent of the iron was recovered as iron hydroxide precipitate. The precipitate was filtered and washed with 5 gallons of water and dried at a temperature of about 200° C. for 72 hours.

The product was then placed in an oven at a temperature of about 100° C., and a mixture of argon and hydrogen was slowly passed over the dried powder. This gas stream had been previously carefully dried and freed of oxygen. The temperature in the furnace was slowly raised over a period of an hour. The flow of hydrogen was then gradually increased and also the temperature in the furnace, until a temperature of 500° C. was reached, whereupon a large excess of hydrogen was passed over the sample in order to complete the reduction. Finally, the temperature was raised to 1200° C. while continuing to pass very dry, pure hydrogen over the sample. In this way, the iron oxide was completely reduced and the $TiO_2$ coating on the thoria was partially reduced, and a finely divided iron powder containing 5 volume percent TiO-coated thoria was produced.

The resulting product was blended with chromium powder, compressed in a one-inch die at a temperature of 500° C. and 20 tons p.s.i., and, after cooling, the resulting mass was heated to above the melting point in an induction furnace. After cooling, a thoria-iron-chromium composition containing 4 volume percent thoria was obtained. This material was useful as an alloying agent for other molten metals.

Example 2

The process of Example 1 was repeated, except that a solution of nickel nitrate was used in place of ferric nitrate, ammonium carbonate in place of ammonium hydroxide, and a higher volume loading of thoria was used. As a result, a billet of nickel containing 8 volume percent of TiO-coated thoria was prepared. The thoria was present in the nickel as discrete particles, the thoria particles having an average size of 40 millimicrons, and being wetted by the nickel, by virtue of the metallophilic surface layer of reduced titania on the surface of the particles.

Example 3

In this example, zirconia was used as the filler core instead of the thoria of Examples 1 and 2.

A zirconia sol was added to the reactor tank; thereafter, a dilute solution of titanium tetrachloride was added in sufficient quantities to give 3 monomolecular layers of $TiO_2$ on the $ZrO_2$. The dispersion of zirconia-titania contained 0.01 percent solids by weight. It was adjusted to pH 4 by the slow addition of ammonium hydroxide.

To disperse this titania-coated zirconia filler in cobalt metal, there was added to the reactor tank, simultaneously but separately, a solution of cobalt nitrate and a solution of ammonium carbonate, following the conditions of addition described in Example 1. A cobalt hydroxide-carbonate precipitate deposited in and around the zirconia particles and embedding them. The product thus prepared was reduced with hydrogen as in Example 1, the titania being partially reduced and the cobalt being completely reduced. The reduced product contained 6 volume percent zirconia, and could be heated above the melting point of the cobalt without separation of the zirconia from the molten metal.

Example 4

In this example, a colloidal solution of anhydrous $Al_2O_3$, prepared by reacting $AlCl_3$ with $H_2O$ in a hot tube, was substituted for the thoria of Example 1. The colloidal alumina consisted of particles about 20 millimicrons in diameter. The alumina particles were treated with $CrOHCl_2$ by a process similar to that used in Example 3 to coat zirconia. A stable colloidal sol containing about 0.05 percent solids was thus prepared. By feeding this solution, ferric nitrate and ammonia simultaneously into a reactor, as in Example 1, reducing with hydrogen and compacting in an inert atmosphere, an iron product containing 3.5 percent (by volume) alumina was prepared.

We claim:
1. In a process for producing a particulate metal oxide composition the steps comprising forming a colloidal aquasol of substantially discrete particles which are 5 to 250 millimicrons in size and comprise a refractory metal oxide filler having a melting point above 1550° C. and a free energy of formation at 1000° C. greater than 100 kilocalories per gram atom of oxygen, effecting contact between the dispersed filler particles in said aquasol and a dissolved compound of a metal selected from the group consisting of vanadium, niobium, manganese, chromium, and titanium, precipitating an oxide of the selected metal from said dissolved compound in contact with the dispersed refractory filler particles whereby the particles are coated with the precipitated oxide, and recovering the coated filler from the liquid.

2. In a process for producing a particulate metal oxide composition the steps comprising forming a colloidal aquasol, of substantially discrete particles which are 5 to 250 millimicrons in size and comprise a refractory metal oxide filler having a melting point above 1550° C. and a free energy of formation at 1000° C. greater than 100 kilocalories per gram atom of oxygen, effecting contact between the dispersed filler particles in said aquasol and a dissolved compound of a metal selected from the group consisting of vanadium, niobium, manganese, chromium, and titanium, precipitating an oxide of the selected metal from said dissolved compound in contact with the dispersed refractory filler particles whereby the particles are coated with the precipitated oxide, recovering the coated filler from the liquid, and reducing the oxide coating on the filler with hydrogen until its oxygen content is in the range of from 0.1 to 1.0 atom per atom of metal.

3. In a process for producing a refractory metal oxide-filled metal the steps comprising forming a colloidal aquasol, of substantially discrete particles which are 5 to 250 millimicrons in size and comprise a refractory metal oxide filler having a melting point above 1550° C. and a free energy of formation at 1000° C. greater than 100 kilocalories per gram atom of oxygen, effecting contact between the dispersed filler particles in said aquasol and a dissolved compound of a metal selected from the group consisting of vanadium, niobium, manganese, chromium, and titanium, precipitating an oxide of the selected metal from said dissolved compound in contact with the dispersed refractory filler particles whereby the particles are coated with the precipitated oxide, and dispersing the oxide-coated filler particles in a metal having an oxide with a free energy of formation at 27° C. up to 75 kilocalories per gram atom of oxygen in the oxide.

4. A process of claim 3 in which the oxide coating of the filler is reduced with hydrogen until its oxygen content is in the range of from 0.1 to 1.0 atom per atom of metal.

5. A process of claim 3 in which the oxide-coated filler particles are dispersed in the matrix metal which has an oxide with a free energy of formation at 27° C. up to 75 kilocalories by coprecipitating the filler particles from a colloidal aquasol thereof together with (a) an oxide of a metal selected from the group consisting of vanadium, niobium, manganese, chromium, and titanium, and (b) a compound of the matrix metal in which the metal is in an oxidized state, separating and drying the coprecipitate, and reducing said matrix metal compound to the metal with hydrogen.

References Cited in the file of this patent
UNITED STATES PATENTS

| | | |
|---|---|---|
| 2,254,976 | Powell | Sept. 2, 1941 |
| 2,580,171 | Hagglund et al. | Dec. 25, 1951 |
| 2,853,398 | Mackew et al. | Sept. 23, 1958 |